United States Patent
Havlir et al.

(10) Patent No.: US 9,633,409 B2
(45) Date of Patent: Apr. 25, 2017

(54) GPU PREDICATION

(71) Applicant: Apple Inc., Cupertino, CA (US)

(72) Inventors: Andrew M. Havlir, Austin, TX (US); Brian K. Reynolds, Austin, TX (US); Michael A. Geary, Round Rock, TX (US)

(73) Assignee: Apple Inc., Cupertino, CA (US)

( * ) Notice: Subject to any disclaimer, the term of this patent is extended or adjusted under 35 U.S.C. 154(b) by 416 days.

(21) Appl. No.: 13/975,520

(22) Filed: Aug. 26, 2013

(65) Prior Publication Data
US 2015/0054837 A1 Feb. 26, 2015

(51) Int. Cl.
| | |
|---|---|
| G06T 1/20 | (2006.01) |
| G06F 9/30 | (2006.01) |
| G06F 9/44 | (2006.01) |
| G06F 9/38 | (2006.01) |

(52) U.S. Cl.
CPC ............ G06T 1/20 (2013.01); G06F 9/30072 (2013.01); G06F 9/30181 (2013.01); G06F 9/30185 (2013.01); G06F 9/3017 (2013.01); G06F 9/3867 (2013.01); G06F 9/3877 (2013.01)

(58) Field of Classification Search
CPC ............... G06F 9/30072; G06F 9/3017; G06F 9/30181; G06F 9/30185; G06F 9/3877; G06F 9/3867; G06T 1/20
USPC .......................... 712/226, 203, 219; 345/506
See application file for complete search history.

(56) References Cited

U.S. PATENT DOCUMENTS

| 5,430,841 | A | * | 7/1995 | Tannenbaum et al. ........ 345/502 |
| 5,724,565 | A | * | 3/1998 | Dubey et al. .................. 712/245 |
| 5,787,026 | A | * | 7/1998 | Orenstein ............. G06F 9/3867 |
| | | | | 708/521 |

(Continued)

FOREIGN PATENT DOCUMENTS

| WO | 2008027574 | 3/2008 |
| WO | 2013101560 | 7/2013 |

OTHER PUBLICATIONS

Office Action in Taiwanese Application No. 103128854 mailed Feb. 19, 2016, 23 pages.
International Preliminary Report in Application No. PCT/US2014/051427 mailed Jul. 28, 2015, 24 pages.
Ujval J. Kapasi, et al., "The Imagine Stream Processor," Appears in the Proceedings of the 2002 International Conference on Computer Design, 7 pages.

(Continued)

*Primary Examiner* — Daniel Pan
(74) *Attorney, Agent, or Firm* — Meyertons, Hood, Kivlin, Kowert & Goetzel, P.C.

(57) ABSTRACT

Techniques are disclosed relating to predication. In one embodiment, a graphics processing unit is disclosed that includes a first set of architecturally-defined registers configured to store predication information. The graphics processing unit further includes a second set of registers configured to mirror the first set of registers and an execution pipeline configured to discontinue execution of an instruction sequence based on predication information in the second set of registers. In one embodiment, the second set of registers includes one or more registers proximal to an output of the execution pipeline. In some embodiments, the execution pipeline writes back a predicate value determined for a predicate writer to the second set of registers. The first set of architecturally-defined registers is then updated with the predicate value written back to the second set of registers. In some embodiments, the execution pipeline discontinues execution of the instruction sequence without stalling.

17 Claims, 6 Drawing Sheets

(56) References Cited

U.S. PATENT DOCUMENTS

| | | | |
|---|---|---|---|
| 6,282,585 B1 | 8/2001 | Batten et al. | |
| 6,487,654 B2 * | 11/2002 | Dowling | 712/244 |
| 6,753,878 B1 * | 6/2004 | Heirich et al. | 345/629 |
| 7,039,793 B2 * | 5/2006 | Col et al. | 712/241 |
| 7,490,229 B2 * | 2/2009 | Tremblay et al. | 712/239 |
| 7,836,289 B2 | 11/2010 | Tani | |
| 2005/0122330 A1 * | 6/2005 | Boyd | G06F 9/325 |
| | | | 345/501 |
| 2009/0254718 A1 * | 10/2009 | Biscondi | G06F 9/30018 |
| | | | 711/154 |
| 2009/0327674 A1 * | 12/2009 | Codrescu | G06F 8/4452 |
| | | | 712/241 |
| 2011/0072248 A1 | 3/2011 | Nickolls et al. | |
| 2011/0078415 A1 * | 3/2011 | Johnson | G06F 9/30021 |
| | | | 712/208 |
| 2012/0084539 A1 | 4/2012 | Nyland et al. | |

OTHER PUBLICATIONS

International Search Report and Written Opinion in Application No. PCT/US2014/051427 mailed Jan. 5, 2015, 12 pages.

Aaron Smith, et al., "Dataflow Predication," The 39th Annual IEEE/ACM International Symposium on Microarchitecture, 2006, 12 pages.

Ryan Taylor, et al., "Software-based Branch Predication for AMD GPUs," ACM SIGARCH Computer Architecture News, vol. 38, No. 4, Sep. 2010, pp. 66-72.

David I. August, et al., "A Framework for Balancing Control Flow and Predication," Proceedings of the 30th Annual IEEE/ACM International Symposium on Microarchitecture, 1997, pp. 92-103.

Office Action in Taiwanese Application No. 103128854 mailed Jul. 25, 2016, 21 pages.

\* cited by examiner

GPU PREDICATION

BACKGROUND

Technical Field

This disclosure relates generally to processors, and, more specifically, to graphics processing units that implement predication.

Description of the Related Art

Graphics processing units (GPUs) typically operate on large amounts of graphics data in parallel using multiple execution pipelines or shaders. As modern GPUs are becoming more and more programmable, with less computation done in fixed-function hardware, GPUs are now performing more complicated tasks than ever before. These tasks may include tasks associated with graphics processing as well as tasks that are unrelated to graphics applications through the use of frameworks, such as OpenCL®, to offload workloads from central processing units (CPUs) to GPUs. As GPU complexity has increased, the complexity of their instruction set architectures (ISA) has increased.

Many GPU ISAs now support instructions that affect control flow based on evaluated conditions such as branch instructions. Branch instructions, however, are difficult to implement on a per-instance basis in a single instruction, multiple data (SIMD) machine such as a GPU. GPUs may alternatively use predication as a way to facilitate management of control flow on a per-instance basis.

SUMMARY

In various embodiments, a graphics processing unit is disclosed that implements predication with respect to one or more execution pipelines. In one embodiment, the graphics processing unit may include a first set of architecturally-defined registers and a second set of shadow registers to facilitate implementation of predication. In some embodiments, the shadow registers are located proximal to the outputs of the execution pipelines and are used to store predicate values at writeback. In some embodiments, the shadow registers are used to update the architecturally-defined registers. In one embodiment, the graphics processing unit evaluates predicate values stored in the shadow registers to determine whether to discontinue execution of an instruction sequence.

In some embodiments, multiple instances of an instruction sequence may be executed in parallel. In such an embodiment, a control unit may determine control information relevant to predication (e.g., dependency information, predicate writer information, instance validity information, etc.). In one embodiment, the control unit is configured to minimize the amount of control information that it determines on a per-instance basis.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The present disclosure describes embodiments in which a graphics processing unit implements predication. The term "predication" has its ordinary and accepted meaning in the art, and refers to beginning execution of instructions that have a dependency on an instruction (e.g., a predicate writer, discussed below) that affects control flow prior to knowing the outcome of that instruction. More specifically, a sequence of instructions may test a condition (i.e., a predicate) and perform a set of actions based on the outcome of that condition—e.g., an instruction sequence that compares two values and performs a set of operations if the values match. In order to evaluate the condition, the instruction sequence may include an initial set of instructions that help in resolving the predicate (i.e., determining the outcome of the condition). For example, this initial set may include an instruction executable to subtract the two values as a match can be identified if the result is zero. This initial set of instructions may conclude with a final instruction that places a value indicative of the tested condition's outcome (e.g., a Boolean value indicative of a match between the two values) into a register that can be examined by a subsequently executed instruction. As used herein, the term "predicate writer" refers to the instruction that sets a value for an evaluated condition in the register; the value is referred to herein as the "predicate value." Once a predicate value has been written into a register by a predicate writer, the value may be subsequently examined in order to determine the path of control flow (i.e., whether to perform a set of actions conditional on the predicate value). In the example above, if the two values match, the path of control flow would include performing the set of actions.

As used herein, the term "predicate reader" refers to any instruction that reads a predicate value. In some embodiments, predicate readers include branch instructions, which may affect control flow by changing a program counter based on a predicate value. In the example above, such an instruction may read the predicate value indicative of a match between the two values and adjust the program counter so that the path of control includes (or does not include) performing the set of dependent actions. In some embodiments, predicate readers may, alternatively, include instructions that conditionally execute based on a predicate value. For example, in one embodiment, the graphics processing unit described herein supports multiple versions of an add instruction—i.e., a version that executes independent of any predicate value and a version that executes conditionally on a predicate value having a particular value. In such an embodiment, different versions of the add instruction may have different respective opcodes.

Accordingly, in various embodiments in which predication is implemented, the graphics processing unit may begin execution instructions (i.e., predicate readers) that are dependent on a predicate writer before the predicate value is known. In such an embodiment, if it is later determined that those instructions do not reside in the taken path of control flow (as indicated by the predicate value once it is known), the graphics processing unit does not allow the results of those instructions to be committed updating architectural state. (Note that predication stands in contrast to out-of-order execution used in speculation in that the instructions are still issued in program order.) Continuing with the example above, if the two values do not match, results of the dependent instructions performing the operations may be discarded when predication is implemented.

As discussed below, in various embodiments, the graphics processing unit may implement various techniques to more efficiently implement predication. In one embodiment, a graphics processing unit may include two sets of registers for storing predication information (e.g., predicate values). The first set may be architecturally defined (i.e., the GPU supports ISA-defined instructions for retrieving and/or changing the contents of the registers); however, these registers may be located remotely from the circuitry generating the predicate information. In contrast, the second set of registers may not be architecturally defined, but located proximal to the circuitry determining predication information. In such an embodiment, when a predicate value is determined, it may be initially stored in the second set of registers due to their proximal location before the predicate value is stored in the first set of registers. In some embodiments, the second set of registers feed logic that can disable circuitry (e.g., pipeline stages) executing instructions that reside in the non-taken path (i.e., do not reside in the path of control flow). In various embodiments, disabling the circuitry in this manner can reduce power consumption of the GPU; still further, using the second set of registers to feed logic may allow for the circuitry to be disabled more quickly. In some embodiments, the graphics processing unit is also able to disable circuitry executing the instructions without performing a pipeline stall.

In some embodiments, the graphics processing unit includes multiple execution pipelines to execute instruction streams in parallel. The term "execution pipeline" has its ordinary and accepted meaning in the art, and refers to circuitry that implements performance of operations specified by an instruction. These operations may include fetching, decoding, issuing, executing, committing, etc. (This term is not to be confused with a "graphics pipeline," discussed below, which refers to a set of operations performed to produce display frames.). As used herein, the term "execution pipeline" may refer to a portion of an execution pipeline or an entire execution pipeline. In such an embodiment, use of multiple execution pipelines may enable the graphics processing unit to execute multiple instances of an instruction sequence in parallel. For example, a first instance of the instruction sequence may be executed in a first execution pipeline to perform operations on pixels in an upper left corner of a frame being displayed while a second instance of the instruction sequence may be executed in a second execution pipeline to perform the same operations on pixels in a lower right corner of the frame. As discussed below, in some embodiments, control information used to facilitate predication may be generated and stored as much as possible on a per-instruction basis, rather than on a per-instance basis. For example, if four instances of the same instruction are being executed, a single set of control information (e.g., dependency information) may be generated, instead of separately generating four copies of the same control information, which is less efficient.

Figure 1A:
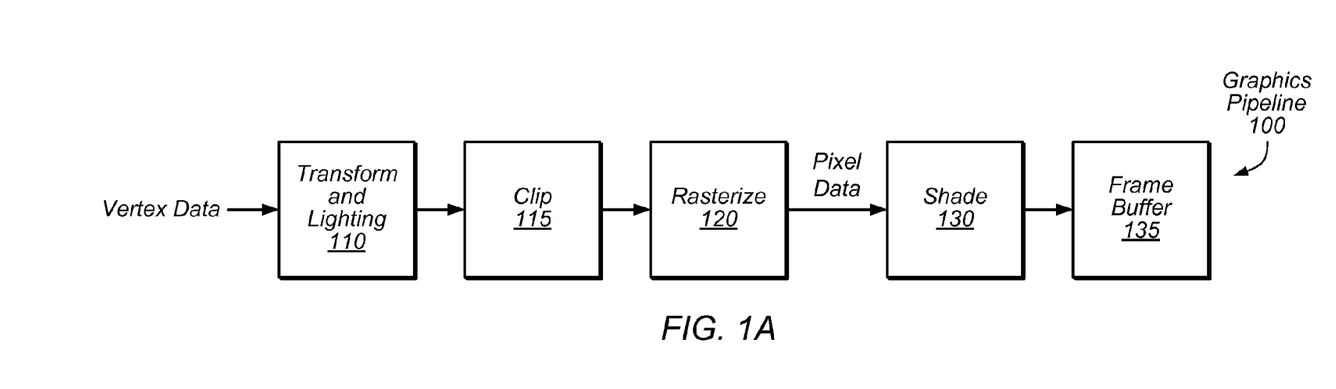
FIG. 1A is a block diagram of an exemplary graphics processing pipeline.
Figure 1B:
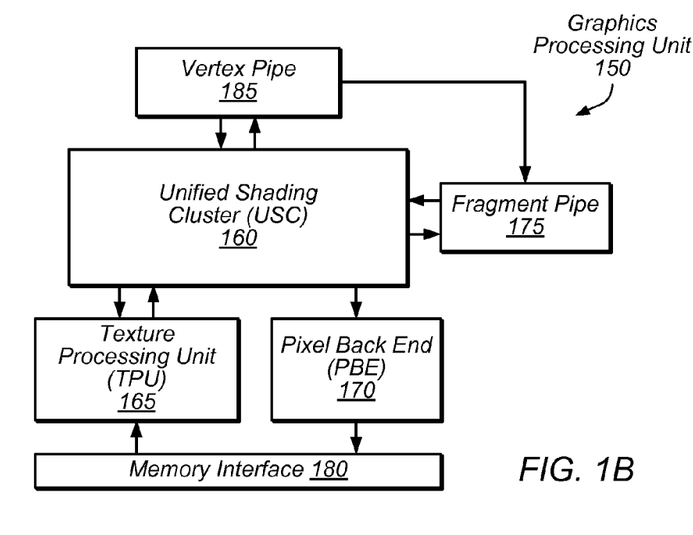
FIG. 1B is a block diagram illustrating one embodiment of a graphics processing unit.

This disclosure initially describes, with reference to FIGS. 1A and 1B, an overview of a graphics pipeline and an exemplary graphics processing unit. The techniques and structures described herein, however, are in no way limited to the graphics pipeline and graphics processing unit shown in FIGS. 1A and 1B; rather, this context is provided only as one possible implementation. Embodiments of a unified shading cluster that implements predication are then described with references to FIGS. 2-5. Finally, an exemplary computing system is described with reference to FIG. 6.

Turning now to FIG. 1A, a block diagram of an exemplary graphics pipeline 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. As discussed next, graphics processing unit (GPU) 150 may include programmable shaders that allow customization of shading and other processing steps by application developers. Thus, in various embodiments, the exemplary steps of FIG. 1A may be performed in various orders, performed in parallel, or omitted, and additional processing steps may be implemented.

Turning now to FIG. 1B, a block diagram of a GPU 150 is shown. In the illustrated embodiment, GPU 150 includes unified shading cluster (USC) 160, vertex pipe 185, fragment pipe 175, texture processing unit (TPU) 165, pixel back end (PBE) 170, and memory interface 180. In one embodiment, GPU 150 may be configured to process both vertex and fragment data using USC 160, which may be configured to process graphics data in parallel using multiple execution pipelines or instances.

Vertex pipe 185, in one embodiment, includes various fixed-function hardware configured to process vertex data. Vertex pipe 185 may be configured to communicate with USC 160 in order to coordinate vertex processing. In the illustrated embodiment, vertex pipe 185 is configured to send processed data to fragment pipe 175 and/or USC 160 for further processing.

Fragment pipe 175, in one embodiment, includes various fixed-function hardware configured to process pixel data. Fragment pipe 175 may be configured to communicate with USC 160 in order to coordinate fragment processing. Fragment pipe 175 may be configured to perform rasterization on polygons from vertex pipe 185 and/or USC 160 to generate fragment data. Vertex pipe 185 and/or fragment pipe 175 may be coupled to memory interface 180 (coupling not shown) in order to access graphics data.

USC 160, in one embodiment, is configured to receive vertex data from vertex pipe 185 and fragment data from fragment pipe 175 and/or TPU 165. USC 160 may be configured to perform vertex processing tasks on vertex data which may include various transformations and/or adjustments of vertex data. In one embodiment, USC 160 is also configured to perform fragment processing tasks on pixel data such as texturing and shading, for example. USC 160 may include multiple execution instances for processing data in parallel. USC 160 may be referred to as "unified" in the sense that it is configured to process both vertex and fragment data, in some embodiments. In other embodiments, programmable shaders may be configured to process only vertex data or only fragment data.

TPU 165, in one embodiment, is configured to schedule fragment processing tasks from USC 160. In one embodiment, TPU 165 may be configured to pre-fetch texture data and assign initial colors to fragments for further processing by USC 160 (e.g., via memory interface 180). TPU 165 may be configured to provide fragment components in normalized integer formats or floating-point formats, for example. In one embodiment, TPU 165 may be configured to provide fragments in groups of four (a "fragment quad") in a 2×2 format to be processed by a group of four execution instances in USC 160.

PBE 170, in one embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as USC 160 may be coupled in any of various appropriate configurations to other programmable and/or fixed-function elements in a graphics processing unit. The exemplary embodiment of FIG. 1B merely shows one possible configuration of a GPU 150.

Figure 2:
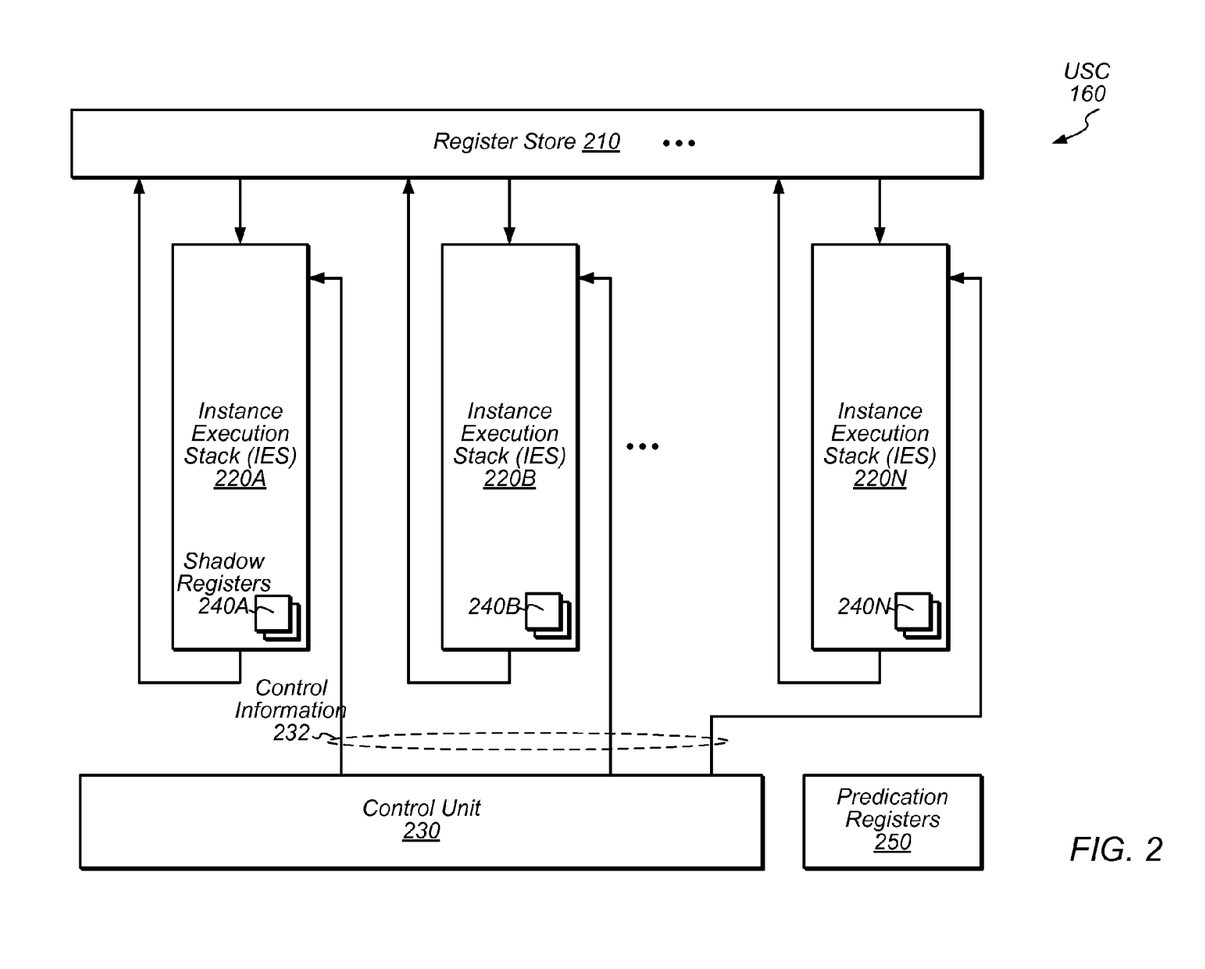
FIG. 2 is a block diagram illustrating one embodiment of a unified shading cluster.

Turning now to FIG. 2, a block diagram of unified shading cluster (USC) 160 is depicted. As discussed below, in various embodiments, USC 160 includes multiple execution pipelines configured to execute instructions. USC 160 may further implement predication as discussed above. Accordingly, in the illustrated embodiment, USC 160 includes register store 210, instance execution stacks (IESs) 220A-N, control unit 230, shadow registers 240, and predication registers 250. In other embodiments, USC 160 may be configured differently—e.g., in one embodiment, predications registers 250 may be located within control unit 230.

Register store 210, in one embodiment, maintains data that is operated on by GPU 150 including USC 160. This data may include, for example, vertex data, pixel data, frame data, etc. for frames being rendered. Register store 210 may be implemented using any of various appropriate storage structures. In one embodiment, register store 210 includes a hundred or more registers for each IES 220, which may be distributed across multiple banks. In one embodiment, each of these banks may be separately accessed. In one embodiment, each bank of register store 210 includes registers for multiple IESs 220. In other embodiments, register store 210 may not be split into multiple banks, but may include multiple read ports. In some embodiments, TPU 165 (discussed above) may be configured to store fragment components in register store 210 prior to scheduling shader operations on the fragment components.

IESs 220, in one embodiment, are execution pipelines, each capable of executing a respective instruction sequence. Accordingly, IESs 220 may include execution units, such as arithmetic logic units (ALU), that include floating-point units, integer units, shift units, etc. IESs 220A-N may be configured to read source operands from register store 210 and to write execution results to register store 210 and/or internally forward results back as operands for subsequent instructions. IESs 220A-N may include operand cache storage to cache results and/or source operands from register store 210. In some embodiments, IESs 220 may not implement an entire execution pipeline—e.g., in one embodiment, fetch, decode, and issuance stages may be handled by other circuitry (not shown).

In various embodiments, IESs 220 are configured to execute instances of the same instruction sequence in parallel. For example, IES 220A may execute an instruction sequence for a shading operation on a first pixel, while IES 220B executes the same instruction sequence on a second pixel. Still further, in some embodiments, IESs 220 may be multi-threaded. Accordingly, in one embodiment, an IES 220 may implement thread interleaving such that a stage in the execution pipeline may process an instruction of a first thread during a first cycle, an instruction of a second thread during a second cycle, and so on.

Control unit 230, in one embodiment, is configured to manage operation of USC 160 including register store 210 and IESs 220. Accordingly, in one embodiment, control unit 230 partially decodes instructions and determines appropriate control information for execution of those instructions. This control information may be used to facilitate routing instructions to the appropriate IESs 220 and retrieve data from register store 210. Control unit 230 may also be configured to receive commands from a source external to USC 160 and facilitate implementation of those commands.

In the illustrated embodiment, USC 160 implements predication through the use of elements 220-250.

Shadow registers 240, in one embodiment, store the most recent predicate values for resolved predicates. That is, as discussed above, an instruction sequence may include an instruction called a predicate writer that is executable to store a predicate value for a predicate being evaluated. Upon computation of the predicate writer, an IES 220 may store the predicate value in a shadow register 240. This stored value may then be evaluated during execution of a later predicate reader in order to determine control flow. In various embodiments, shadow registers 240 may support storing predicate values for multiple threads as well as multiple predicate values for a given thread. For example, in one embodiment in which IES 220A supports three threads and up to two architecturally-defined predicate registers per thread, shadow registers 240A may include six registers. In some embodiments, shadow registers 240 may store additional metadata about stored predicate values such as initialization bits indicating when predicate values have been stored and dirty bits indicating whether stored predicate values have become stale. In other embodiments, this metadata may be stored elsewhere such as within control unit 230. As discussed below in conjunction with FIG. 3, in various embodiments, shadow registers 240 are configured to provide predicate values to logic configured to evaluate the predicate values in conjunction with control information 232 in order to determine whether to disable executing instances of instruction sequences. In the illustrated embodiment, registers 240 are characterized as "shadow" registers because they are not architecturally defined and are configured to mirror predication registers 250 (i.e., coherence is maintained between with shadow registers 240 and predication registers 250).

Predication registers 250, in one embodiment, are architecturally-defined registers that store predicate values. That is, GPU 150 may support instructions for reading from and/or writing to registers 250. In contrast to shadow registers 240, in various embodiments, predication registers 250 are not coupled to control logic configured to disable execution of instructions. Still further, in some embodiments, shadow registers 240 may be located proximal to control logic and the output stages of IESs 220, while predication registers 250 may be located far away from the control logic and the output stages. As a result, a predicate value may be read from a shadow register 240 more quickly by IES control logic than if the control logic had read the corresponding predication register 250. Thus, the control logic may be able to more quickly discontinue execution of the instruction sequence. Like shadow registers 240, in some embodiments, predication registers 250 may be configured to store predicate values for multiple executing threads, multiple predicate values for each executing instance of a given thread, and even multiple predicate values for a given instance. Predication registers 250 may also store metadata relevant to predicate values such as initialization bits and dirty bits.

In various embodiments, USC 160 maintains coherency between shadow registers 240 and predication registers 250 by writing resolved predicate values from IESs 220 to shadow registers 240 and then using shadow registers 240 to update predication registers 250. For example, as discussed below with FIG. 3, in one embodiment, upon completion of predicate writer, IES 220A may write back the predicate value to a shadow register 240A, which, in turn, provides the predicate value to the corresponding predication register 250. In various embodiments, USC 160 also maintains coherency by updating shadow registers 240 with predicate values (referred to as fill-in values) from predication registers 250. In one embodiment, such an update may occur responsive to a thread restart. That is, USC 116 (or more specifically control unit 230, in one embodiment) may determine to switch from executing one thread to another thread for various reasons. In performing the switch, predicate values in shadow registers 240 for the thread may be replaced with predicate values for the new thread (i.e., in such an embodiment, shadow registers 240 do not store predicate values for non-executing threads; predication registers 250, however do. When execution of the original thread is restarted, the predicate values from predication registers 250 may be written back into shadow registers 240 in order to main coherency.

In some embodiments, shadow registers 240 may be updated with predicate values from predication registers 250 even if the shadow registers 240 are associated with disabled instances (i.e., instances for which execution has been discontinued). As noted above, an instance of an instruction sequence may be disabled based on a predicate value of a prior predicate writer. An instance of an instruction sequence may also be disabled upon issuance of the instruction sequence to an IES 220. This may occur in some embodiments in which the same instruction sequence is issued to all of IESs 220 regardless whether that many instances need to be executed. That is, for some tasks, it may be appropriate to execute only one or two instances of an instruction sequence. Rather than issue the instruction sequence to merely IES 220A and 220B, for example, the instruction sequence may be issued, in such an embodiment, to all of IESs 220. Instances of the instruction sequence that are not provided to IESs 220A and 220B, however, may be disabled upon issuance. In some embodiments, maintaining coherence of predicate values for even disabled instances may reduce the overhead for tracking outstanding predicate writers.

In various embodiments, control unit 230 is further configured to generate control information to facilitate predication—shown in the illustrated embodiment as control information 232. In some embodiments, control information 232 may include information relating to the coherence between registers 240 and 250. Accordingly, in one embodiment, control unit 230 may write a predicate value to one of predication registers 250 (e.g., responsive to a thread restart) and, in response to writing the predicate value, issue the predicate value as control information 232 to the corresponding IES 220 to cause the predicate value to be stored in a shadow register 240. As discussed below with respect to FIG. 3, in such an embodiment, control unit 230 may use the datapath of an IES 220 to store the predicate fill-in value in the shadow register 240. In some embodiments, control information 232 may also include dependency information that is used by control logic in evaluating a predicate value to determine whether to disable an instance. As discussed below with respect to FIG. 4A, this dependency information may include an indication of whether an instruction is dependent on a predicate writer and, if so, which particular predicate writer. This dependency information may also include an indication of polarity and an indication of which shadow register 240 stores the relevant predicate value. In some embodiments, control information 232 may further identify which instructions are predicate writers as well as specify the registers 240 to which predicate values are to be written. As discussed below with respect to FIG. 4B, control information 232 may also include a validity indication specifying whether an instance is still valid (i.e., has not been disabled yet).

In some embodiments, control unit 230 is configured to determine control information 232 based on a decode of instructions to be issued to IESs 220 as well as previously determined predicate values in predication registers 250. For example, control unit 230 may examine opcodes and predicate values to determine general control flow as well as identify which instructions are predicate readers, predicate writers, and instructions dependent on predicate writers. In one embodiment, upon identifying that an instruction sequence includes a predicate writer, control unit 230 may set a dirty bit for the predication register 250 relevant to that predicate writer as any stored predicate value in that register 250 may become stale upon completing execution of the predicate writer.

In various embodiments, control unit 230 is configured to determine as much control information as possible on a per-instruction basis, rather than a per-instance basis. In one embodiment, this control information includes dependency information as discussed above. Accordingly, control unit 230 may perform a single determination of dependency information for an instruction executing in IESs 220A-N, rather than N determinations for each instance of the instruction. Still further, control unit 230 may store a single copy of the control information, which it distributes to IESs 220 (as opposed to storing multiple copies). In some embodiments, this control information also includes predicate writer information as discussed above.

In some embodiments, various ones of the techniques implemented by USC 116 may improve performance and/or power savings for GPU 150. Using shadow registers 240 proximal to outputs of IESs 220 may allow for faster disabling of pipeline stages—thus saving power. Still further, as will be discussed with respect to FIG. 3, in some embodiments, execution of an instruction sequence may be disabled in a manner that does not include performing a pipeline stall—thus increasing performance of GPU 150. Determining control information on a per-instruction basis may also consume less computational resources and power than determining control information on a per-instance basis.

Figure 3:
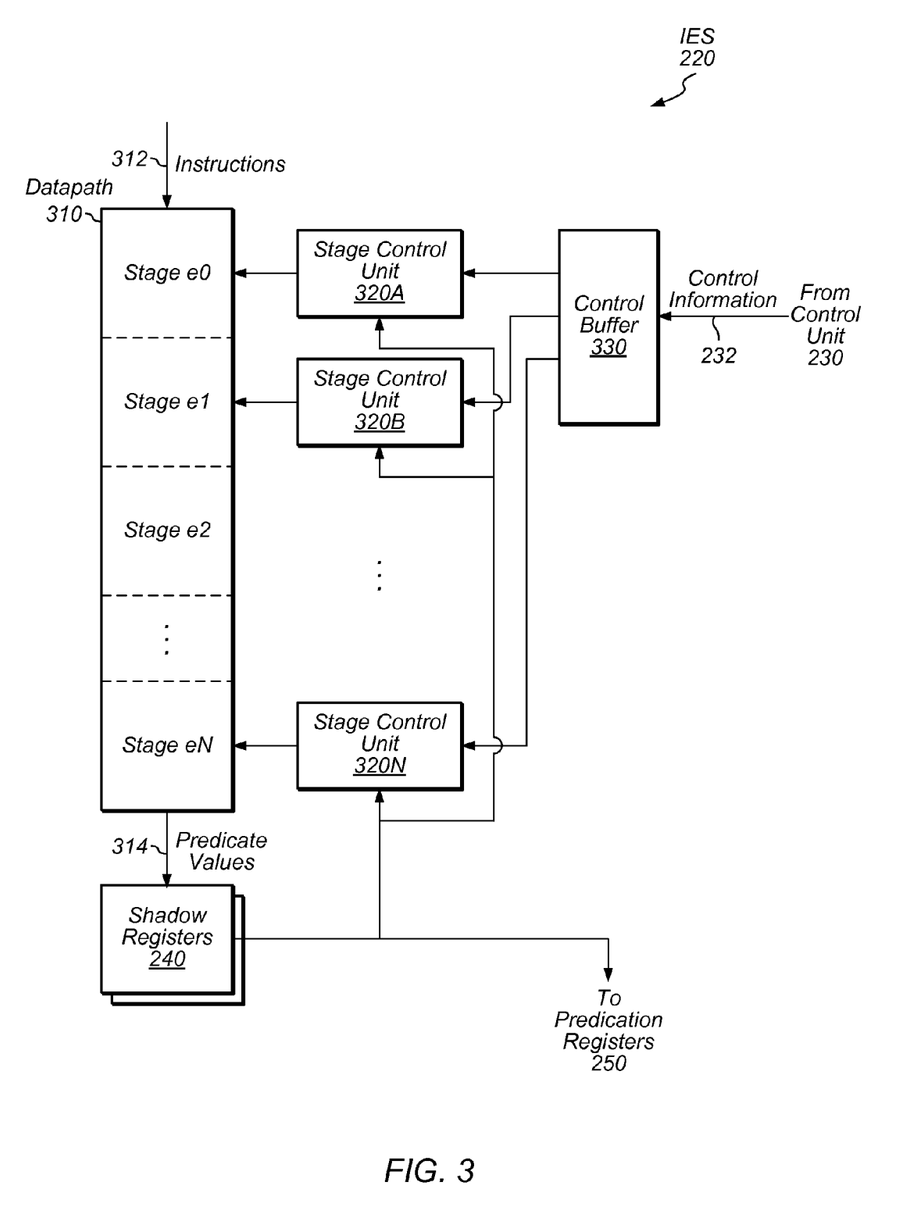
FIG. 3 is a block diagram illustrating one embodiment of an instance execution stack.

Turning now to FIG. 3, a block diagram of an IES 220 is depicted. In the illustrated embodiment, IES 220 includes shadow registers 240, a datapath 310, stage control units 320, and a control buffer 330. In other embodiments, IES 220 may be configured differently than shown—e.g., in one embodiment, stage control units 320 and control buffer 330 may be considered as part of control unit 230 discussed above.

Datapath 310, in one embodiment, is configured to execute received instructions 312 within pipeline stages e0-eN. In one embodiment, datapath circuitry in stage e0 may receive opcodes, control signals, and data operands from register store 210 to be processed in subsequent stages. In one embodiment, stage e1 may include circuitry that reads local operand caches and routes information received in stage e0 to appropriate ALUs. In stages e2-eN-1, in one embodiment, ALUs may operate on data for one or more clock cycles to compute instruction results. Finally, in stage eN, instruction results may be written back (i.e., committed) to one or more registers (and forwarded on to register store 210, in some embodiments).

In various embodiments, upon completing execution of predicate writers, determined predicate values 314 are written back to shadow registers 240. In some embodiments, shadow registers 240 may be selected for storing predicate values based on control information 232 as noted above. As shown, shadow registers 240 are located near stage eN (i.e., the output of datapath 310 in the illustrated embodiment). (As noted above, this may allow for a quicker evaluation of predicate values in some embodiments.) In the illustrated embodiment, predicate values 314 written back to shadow registers 240 may be subsequently provided to stage control units 320 and predication registers 350. In one embodiment, when data is provided from shadow registers 240 to predication registers 250, the entirety of registers 240 is written to predication registers 250 (as opposed to individual bits corresponding to updated ones of predicate values 314). In doing so, USC 116 may forgo implementing a mask to select individual bits for transmission—thus simplifying logic.

Stage control units 320, in one embodiment, are configured to evaluate predicate values 314 and control information 232 in order to determine whether to disable execution of an instruction sequence at a respective pipeline stage in datapath 310. In one embodiment, if a predicate value has already been determined for a dependent instruction at given pipeline stage, stage control unit 230 may evaluate the predicate value against the polarity (as specified by control information 232, in some embodiments). Depending on this evaluation, stage control unit 320 may disable execution at its respective stage (e.g., stage e0 for stage control unit 320A). In one embodiment, a stage control unit 320 performs disabling by clock gating the pipeline stage (or, at least, a portion of logic within that stage) so that logic is not being driven. In another embodiment, however, stage control unit 320 may power gate the pipeline stage. As the instruction advances to subsequent stages, stage control units 230 corresponding to those stages may perform the same evaluation and make a similar determination to enable or disable execution of the instruction. In one embodiment, if a predicate value has not yet been determined for a dependent instruction (i.e., the predicate writer is still being processed in datapath 310), a stage control unit 320 may allow the instruction to continue executing, and evaluation may be postponed. As noted above, control information 232 may specify which instruction the given instruction is dependent on (e.g., that the given instruction is dependent on a predicate writer one instruction ahead, a predicate writer two instructions ahead, etc.), so that a stage control unit 320 is aware of when a predicate value will become available for evaluation. Thus, as the instruction advances through stages of datapath 310, a subsequent stage control unit 320 can evaluate the predicate value upon being determined. At which point, the subsequent stage control unit 320 may determine to disable execution. In various embodiments, being able to evaluate an instruction at each pipeline allows execution of an instruction to be disabled while it is in datapath 310 (e.g., post issuance) and without stalling the pipeline. That is, an instruction does not need to be held at a particular stage until the corresponding predicate value is determined—thus also preventing it from holding up later instructions in datapath 310.

Control buffer 330, in one embodiment, is configured to store control information 232 received from control unit 230 and relay that information to the appropriate stage control units 320. Accordingly, when an instruction 312 arrives at stage e0, control buffer 330 may provide the corresponding control information 232 for that instruction to stage control unit 320A. As the instruction advances to later stages of datapath 310, control buffer 330 may provide the control information 232 for that instruction to subsequent stage control units 320. In some embodiments, control buffer 330 is implemented as a circular buffer. That is, control buffer 330 may maintain a pointer that, in one embodiment, identifies a next available entry where control information 232 may be stored for an instruction. As entries are filled, control buffer 330 may sequentially advance the pointer. Upon reaching a last entry in buffer 330, the pointer may be wrapped around to an initial entry—thus giving the buffer its "circular" name. In one embodiment, control buffer 330 may determine where to route data from buffer entries based on the position of this pointer. In some embodiments, control buffer 330 may store fill-in values from predication registers 250 to update shadow registers 240. As noted above, in one embodiment, control unit 230 may update predicate values in this manner in response to a thread restart. In some embodiments, upon doing so, control unit 230 may provide the predicate values as control information 232. In such an embodiment, control buffer 330 may store received predicate values and provide them to datapath 310 (e.g., to stage eN) for storage in shadow registers 240. Examples of information that may be included within control buffer 330 are described next with respect to FIGS. 4A and 4B.

Figure 4A:
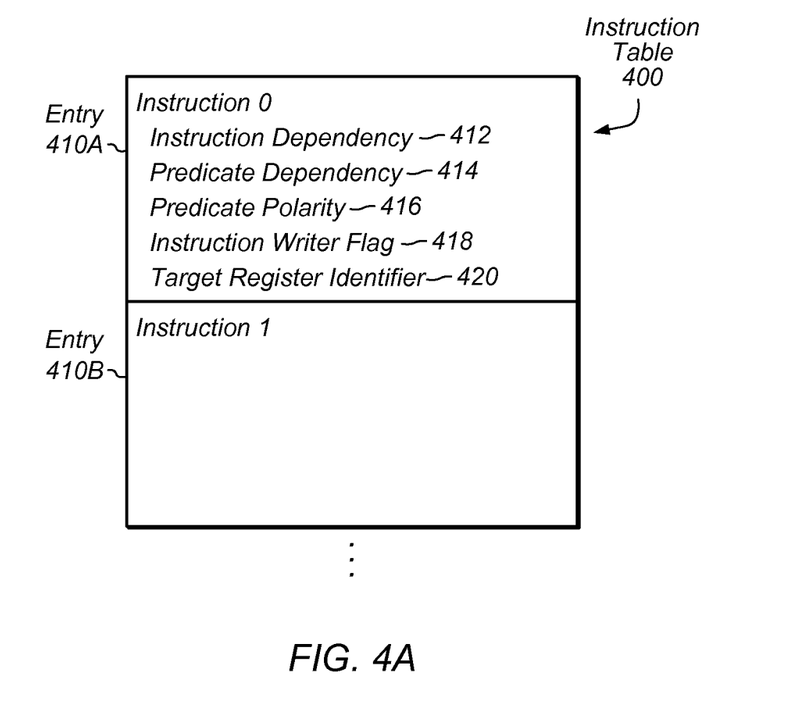
FIG. 4A is a block diagram illustrating one embodiment of a table that includes predication information maintained on a per-instruction basis.

Turning now to FIG. 4A, a block diagram of an instruction table 400 is depicted. Instruction table 400 is one embodiment of control information that may be generated on a per-instruction basis as discussed above. In some embodiments, data within table 400 may be determined by control unit 230 and stored within control buffer 330. In the illustrated embodiment, entries 410 within table 400 specify an instruction dependency 412, predicate dependency 414, predicate polarity 416, instruction writer flag 418, and target register identifier 420. In such an embodiment, information 412-416 may generally be referred to as dependency information, while information 418 and 420 may generally be referred to as predicate writer information.

Instruction dependencies 412, in one embodiment, specify whether an instruction is dependent on another instruction and, if so, identify the particular instruction. For example, instruction dependency 412 may specify that the instruction at particular pipeline stage is dependent on a predicate writer that is two instructions ahead in datapath 310. As noted above, instruction dependencies 412 may be used to determine whether a predicate value needs to be evaluated for a given instruction as well as when that predicate value will become available.

Predicate dependencies 414, in one embodiment, specify which particular shadow register 240 includes a predicate value relevant to a given instruction. As noted above, shadow registers 240 may store multiple predicate values for a given instance, which may be one of several instances, which may correspond to one of several threads. Accordingly, a stage control unit 320 may use a predicate dependency 414 to identify the correct register 240 to read.

Predicate polarity 416, in one embodiment, identifies a polarity for predicate value of a predicate reader. That is, in one embodiment, GPU 150 may support a first type of predicate that dictates taking a particular path (e.g., writing back the predicate reader results) responsive to a predict value being true and a second type of predicate reader that dictates taking the path responsive to the predicate value being false. Accordingly, predicate polarity 416 may identify whether a predicate reader is the first type or the second type.

Instruction writer flag 418, in one embodiment, identifies whether a given instruction is a predicate writer. Accordingly, flag 418 may be used by datapath 310 in determining whether a write back is going to be performed to one of shadow registers 240 for the instruction.

Target register identifier 420, in one embodiment, further specifies the shadow register 240 to which the predicate value of a predicate writer is to be written. Accordingly, datapath 310 may use target register identifier 420 to route a predicate value to the appropriate shadow register 240.

Figure 4B:
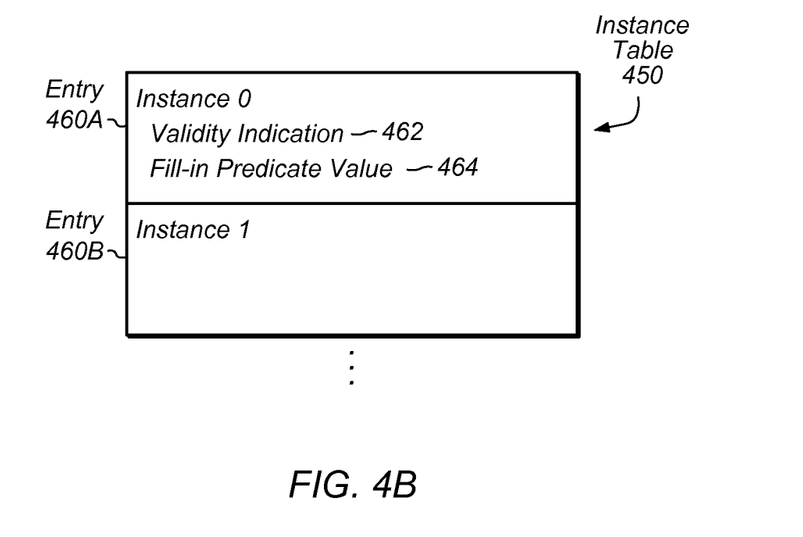
FIG. 4B is a block diagram illustrating one embodiment of a table that includes predication information maintained on a per-instance basis.

Turning now to FIG. 4B, a block diagram of an instance table 450 is depicted. Instance table 450 is one embodiment of control information that may be generated on a per-instance basis. In some embodiments, data within table 450 may be determined by control unit 230 and stored within control buffer 330. In the illustrated embodiment, entries 460 within table 450 include a respective validity indication 462 and a fill-in predicate value 464.

Validity indications 462, in one embodiment, indicate whether a given instance is to be disabled or is to be enabled pending any predicate values. As noted above, in some embodiments, the same instruction sequence may be issued to each of IESs 220 even if only one or two instances need to be executed for a particular task. Accordingly, in such an embodiment, control unit 230 may specify at issuance that a given instance does not need to be executed via a validity indication 462—thus no evaluation of any predicate value may be warranted for that instance.

Fill-in predicate values 464, in one embodiment, are predicate values from predication registers 250 that are to be written to shadow registers 240 in order to maintain coherency. Accordingly, fill-in predicate values 464 may be provided when a thread is being restarted as discussed above, for example.

Figure 5:
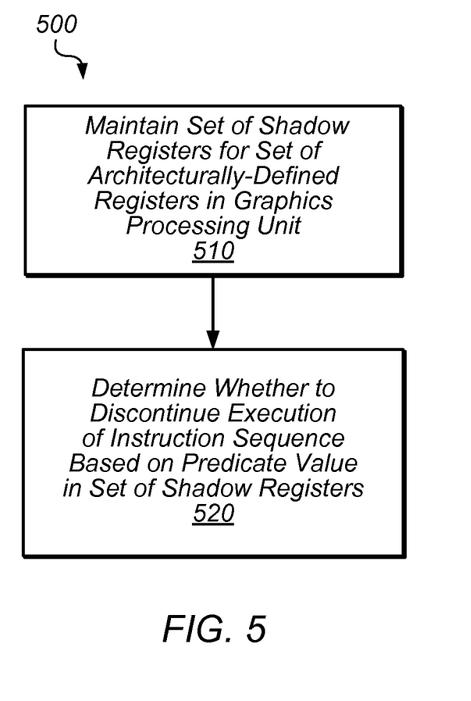
FIG. 5 is a flow diagram illustrating one embodiment of a method for performing predication.

Turning now to FIG. 5, a flow diagram of a method 500 is depicted. Method 500 is one embodiment of a method that may be performed by a graphics processing unit that implements predication such as GPU 150. In some embodiments, performance of method 500 may improve power savings and/or performance of the graphics processing unit.

In step 510, a set of shadow registers (e.g., shadow registers 240) is maintained for a set of architecturally-defined registers (e.g., predication registers 250) in a graphics processing unit. In such an embodiment, the set of architecturally-defined registers stores predicate values (e.g., predicate values 314) for instruction sequences. In some embodiments, step 510 includes executing an instruction that computes a predicate for an instruction sequence and writing back a predicate value of the computed predicate to the set of shadow registers prior to storing the written-back predicate value in the architecturally-defined registers.

In step 520, a determination whether to discontinue execution of an instruction sequence is made based on a predicate value in one of the set of shadow registers. In one embodiment, the determining is performed prior to storing the written-back predicate value in the set of architecturally-defined registers. In some embodiments, step 520 includes executing a plurality of instances of an instruction in separate execution pipelines (e.g., separate IESs 220), performing a single determination of control information (e.g., control information 232) for the instruction, and distributing the control information to each of the execution pipelines. In various embodiments, in response to determining to discontinue execution of the instruction sequence, execution of the instruction sequence is discontinued without performing a stall in the execution pipeline executing the instruction sequence. In some embodiments, step 520 further includes control logic (e.g., stage control units 320) clock gating one or more stages (e.g., stages e0-eN) of the execution pipeline.

Figure 6:
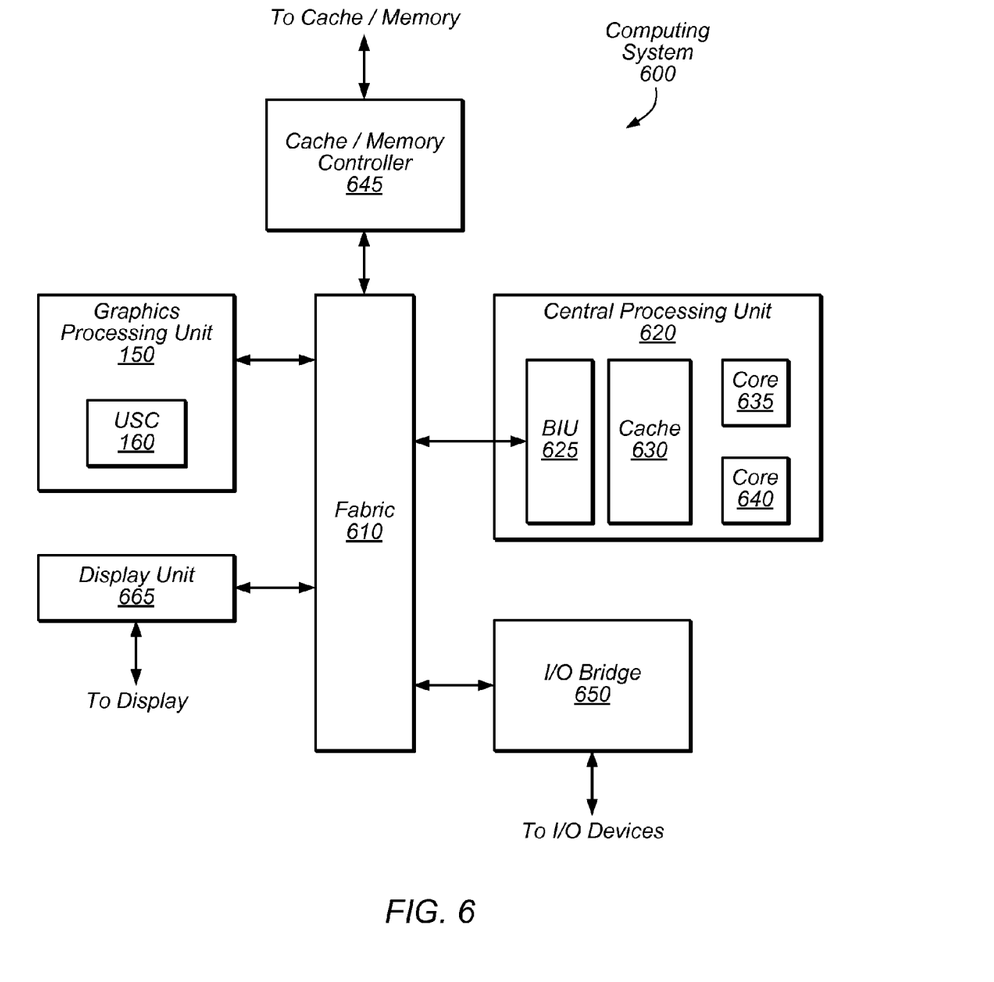
FIG. 6 is a block diagram illustrating one embodiment of an exemplary computing system.

Turning next to FIG. 6, a block diagram illustrating an exemplary embodiment of a computing system 600 is shown. Computing system 600 is one embodiment of a computing system that may include graphics processing unit 150 discussed above. In some embodiments, elements of computing system 600 may be included within a system on a chip (SoC). In some embodiments, computing system 600 may be included in a mobile device, which may be battery-powered. Therefore, power consumption by computing system 600 may be an important design consideration. In the illustrated embodiment, computing system 600 includes fabric 610, central processing unit (CPU) 620, input/output (I/O) bridge 650, cache/memory controller 645, graphics processing unit 150, and display unit 665.

Fabric 610 may include various interconnects, buses, MUX's, controllers, etc., and may be configured to facilitate communication between various elements of computing system 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, CPU 620 includes bus interface unit (BIU) 625, cache 630, and cores 635 and 640. In various embodiments, CPU 620 may include various numbers of cores and/or caches. For example, CPU 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in computing system 600 may be configured to maintain coherency between various caches of computing system 600. BIU 625 may be configured to manage communication between CPU 620 and other elements of computing system 600. Processor cores such as cores 635 and 640 may be configured to execute instructions of a particular instruction set architecture (ISA), which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics processing unit 150 may be described as "coupled to" a memory through fabric 610 and cache/memory controller 645. In contrast, in the illustrated embodiment of FIG. 6, graphics processing unit 150 is "directly coupled" to fabric 610 because there are no intervening elements.

GPU 150 may receive graphics-oriented instructions, such as OPENGL® or DIRECT3D® instructions, for example. GPU 150 may execute specialized GPU instructions or perform other operations based on the received graphics-oriented instructions. GPU 150 may generally be configured to process large blocks of data in parallel and may build images in a frame buffer for output to a display. GPU 150 may include transform, lighting, triangle, and/or rendering engines in one or more graphics processing pipelines. GPU 150 may output pixel information for display images. In the illustrated embodiment, GPU 150 includes USC 160; in some embodiments, GPU 150 may have multiple processing cores each including a respective USC 160.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 600 via I/O bridge 650.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A graphics processing unit, comprising:
a first set of registers, wherein the first set of registers includes architecturally-defined registers;
a second set of registers configured to mirror the first set of registers; and
an execution pipeline configured to:
implement predication for an instruction sequence having opcodes that indicate whether the instruction sequence is to be conditionally executed based on a predicate value generated by a predicate writer instruction;
store the predicate value in the second set of registers; and
update the first set of registers with the predicate value in the second set of registers; and
control logic configured to:
perform evaluation of the predicate value in the second set of registers; and
based on the evaluation, cause the execution pipeline to discontinue execution of the instruction sequence by clock gating one or more stages of the execution pipeline.

2. The graphics processing unit of claim 1, wherein the second set of registers includes one or more registers proximal to an output of the execution pipeline such that the one or more registers are nearer to the output than the first set of registers.

3. The graphics processing unit of claim 1, wherein the execution pipeline is configured to discontinue execution of the instruction sequence without stalling.

4. The graphics processing unit of claim 1, further comprising:
  a plurality of execution pipelines, wherein each execution pipeline is configured to execute a respective instance of the instruction sequence in parallel; and
  wherein the second set of registers is configured to store predication values associated with each of the instances executing within the plurality of execution pipelines.

5. The graphics processing unit of claim 4, further comprising:
  a control unit configured to provide dependency information for the instruction sequence to the plurality of executing pipelines including the execution pipeline, wherein the plurality of execution pipelines is configured to use dependency information and predication values stored in the second set of registers to determine whether to discontinue execution of the instances.

6. The graphics processing unit of claim 5, wherein the control unit is configured to determine the dependency information on a per-instruction basis.

7. The graphics processing unit of claim 5, wherein the dependency information specifies one or more of the second set of registers as having predicate values relevant to the instruction sequence.

8. The graphics processing unit of claim 1, further comprising:
  a control unit configured to issue a predicate value to the execution pipeline to cause the predicate value to be stored in the second set of registers.

9. A method, comprising:
  maintaining a set of shadow registers for a set of architecturally-defined registers in a graphics processing unit, wherein the set of architecturally-defined registers is configured to store a predicate value for an instruction sequence having opcodes indicating that the instruction sequence is to be conditionally executed based on the predicate value;
  executing, at an execution pipeline, an instruction that determines a predicate value for the instruction sequence;
  writing back the predicate value to the set of shadow registers prior to storing the written-back predicate value in the set of architecturally-defined registers;
  evaluating a polarity of the predicate value in the set of shadow registers; and
  based on the evaluating, determining whether to discontinue execution of the instruction sequence by disabling a clock signal supplied to one or more stages of the execution pipeline.

10. The method of claim 9, wherein the determining is performed prior to storing the written-back predicate value in the set of architecturally-defined registers.

11. The method of claim 9, further comprising:
  executing a plurality of instances of an instruction in separate execution pipelines;
  performing a single determination of control information for the instruction; and
  distributing the control information to each of the execution pipelines.

12. The method of claim 9, further comprising:
  in response to determining to discontinue execution of the instruction sequence, discontinuing execution of the instruction sequence without performing a stall in an execution pipeline executing the instruction sequence.

13. An apparatus, comprising:
  an execution pipeline of a graphics processing unit configured to:
    implement predication for a sequence of instructions having opcodes specifying that the sequence of instructions is to be conditionally executed based on a predicate value generated by a predicate writer instruction; and
    execute the predicate writer instruction to generate the predicate value; and
  a control logic configured to:
    perform evaluation of a polarity of the generated predicate value against a polarity identified from the opcodes; and
    based on the evaluation, cause clock gating of logic within one or more pipeline stages of the execution pipeline to discontinue execution at the one or more pipeline stages.

14. The apparatus of claim 13, further comprising:
  a control unit configured to provide dependency information usable by the control logic and with a predicate value to determine whether to disable execution of the sequence of instructions by clock gating the logic.

15. The apparatus of claim 14, wherein the control unit is configured to provide the dependency information to a circular buffer coupled to the control logic.

16. The apparatus of claim 14, further comprising:
  a plurality of multi-threaded execution pipelines, wherein each execution pipeline is configured to execute a respective instance of the sequence of instructions, and wherein the control unit is configured to cause clock gating of logic within each execution pipeline.

17. The apparatus of claim 13, further comprising:
  a circuit configured to perform shading operations in a graphics pipeline, wherein the circuit includes the execution pipeline and the control logic.

* * * * *